Figure 1:
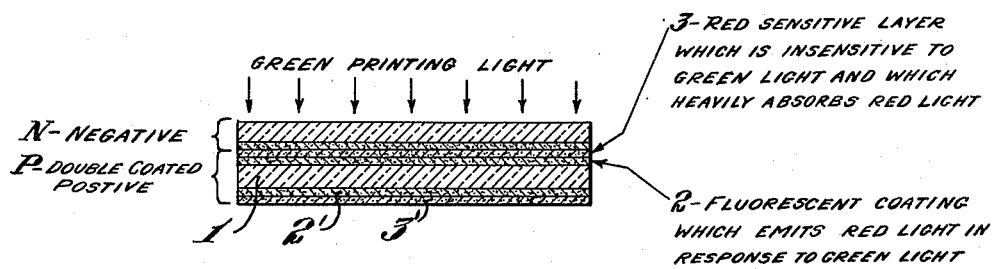

Sept. 26, 1950           G. F. RACKETT           2,523,843
PHOTOGRAPHIC LIGHT-SENSITIVE ELEMENT
AND METHOD OF USING IT
Filed May 3, 1946

Inventor
Gerald F. Rackett
By Roberts, Cushman & Grover
att'ys.

Patented Sept. 26, 1950

2,523,843

UNITED STATES PATENT OFFICE 2,523,843

PHOTOGRAPHIC LIGHT-SENSITIVE ELEMENT AND METHOD OF USING IT

Gerald F. Rackett, Los Angeles, Calif., assignor to Technicolor Motion Picture Corporation, Hollywood, Calif., a corporation of Maine Application May 3, 1946, Serial No. 667,074

2 Claims. (Cl. 95—8)

In the art of photography it is often desirable to expose a film through the backing or base, as for example in forming relief images by hardening the gelatin throughout the exposed portions and then etching off the unexposed portions of the gelatin. Heretofore this has not been feasible with double-coated film, that is film coated with a light sensitive layer on each side, because the layer on the far side can not be exposed through the base without also exposing the layer on the near side. While the layers may be exposed from the front and then developed by a reversal method, this procedure involves additional steps and does not afford such good results.

Objects of the present invention are to produce a film and method with which a latent image may be formed in a sensitive layer in response to light to which the layer is substantially insensitive and with which one layer of a double-coated film may be exposed through the base without substantially exposing the other layer.

In one aspect the invention involves a film or other sheet material comprising a backing, a fluorescent coating which emits secondary radiation in response to primary radiation and a layer which is sensitive to the secondary radiation. Preferably the coating is intermediate the layer and backing and the layer is substantially insensitive to the primary radiation. While either the primary radiation or the secondary radiation or both may comprise invisible rays, in the preferred embodiment the primary radiation comprises green light and the secondary radiation red light, in which case the fluorescent coating emits red light when excited with green light. For the purpose of making reliefs the sensitive layer should be heavily absorptive of the secondary radiation so that instead of exposing the layer all the way through the exposed portions are confined largely to the strata of the layer nearest the fluorescent coating. In the case of double-coated stock the primary radiation should not pass through to the second fluorescent coating and the secondary radiation should not pass through to the second sensitive layer. The primary radiation may be obstructed by the first fluorescent coating or a filter layer applied to one side of the base between the two fluorescent coatings or by dyeing the base itself in cases where the base need not be transparent as when using the resulting reliefs as imbibition printing matrices. The secondary radiation may be confined to the corresponding sensitive layer by the aforesaid filter layer or base. When using a transparent base the dye or dyes in the various layers and coatings should be of the fugitive type which wash out in the developing process. If desired a layer of gelatin or other transparent material may be incorporated between any two adjacent coatings or between any layer and coating or transparent intermediate layers may be incorporated at all of these locations, thereby to insure that the dyes and other chemicals in the various layers and coatings do not affect the adjacent layers or coatings.

In another aspect the invention involves the method which comprises transmitting primary radiation to the aforesaid coating to produce secondary radiation therein and with the secondary radiation forming an image in the adjacent sensitive layer. When the image is to be converted into a relief, the sensitive layer is then etched to remove the unexposed gelatin. If the gelatin is of the bichromate type the sensitive layer may be etched as soon as exposed, but if the layer is sensitized with silver salts it has to be developed with a developer which hardens the gelatin in the exposed regions before the layer is etched. In the case of double-coated stock the primary radiation is transmitted through the sensitive layer to excite the fluorescent coating.

Figure 2:
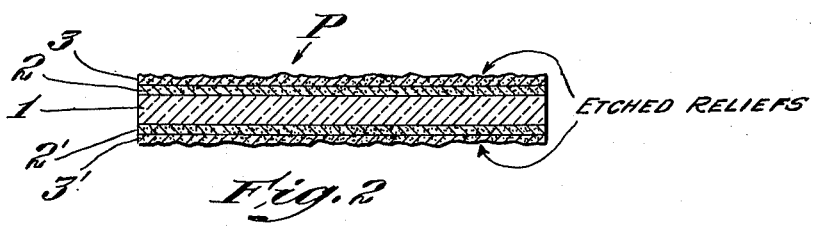

For the purpose of illustration a typical embodiment has been shown in the accompanying drawings in which Fig. 1 illustrates the step of printing one side of double-coated film made according to this invention; and Fig. 2 shows the double-coated stock after it has been exposed and etched on both sides.

In the particular embodiment of the invention chosen for the purpose of illustration N represents a negative film and P a double-coated positive made according to the present invention. The positive P comprises a base 1 of cellulose acetate or cellulose nitrate, the fluorescent coatings 2 and 2', and layers 3 and 3' which are sensitized to the secondary radiation emitted by the fluorescent coatings.

To emit red light when excited with green light the fluorescent coatings may be made with a composition comprising 5 gms. of gelatin and 5 gms. of cadmium sulfide (activated with $10^{-4}$ or less of copper) in 50 cc. of water. Such coatings are excited by light having wave-lengths of about 5000 A. to 5200 A. and emit radiation in the region of 6200 A. to 7500 A.

While various sensitizing dyes may be employed in the layers 3 and 3', depending upon the wave length of the secondary radiation, when the secondary radiation comprises red light the dye is preferably dicyanin which produces sensitivity in the region 6000 A. to 7000 A. but which produces substantially no sensitivity in the green region. The screening dye employed in each of the two sensitive layers, for confining the latent images to the portions of the layers nearest the base, may comprise a mixture of the following two components A and B:

A

| | |
|---|---|
| Water | 3500 cc. |
| Ammonium Bromide | 350 gm. |
| Ammonium Iodide | 8 gm. |
| Soft Gelatin | 150 gm. |

B

| | |
|---|---|
| Silver Nitrate | 500 gm. |
| Water | 2500 cc. |

Ammonia, conc. to redissolve

Just before mixing, add 50 cc. of a 1:1000 alcoholic solution of dicyanin.

After mixing these two components, 10 to 100 cc. of a 2% solution of Naphthol Green B in water is added, after which 650 grams of dry gelatin is added and stirred in.

To form relief images on the opposite sides of the film P, each side is first exposed as illustrated in Fig. 1. The green printing light excites the fluorescent coating 2, causing it to emit red light which exposes the adjacent coating 3. By incorporating in the sensitized layer 3 a dye which heavily absorbs red light, the latent image is confined to the side of the layer 3 nearest the base 1.

After each side of the film P has been exposed in this way the film is developed with a pyro developer or other developer which hardens the gelatin in the region of the latent image. After development the gelatin in the unexposed regions of the layers 3 and 3' is washed off in hot water to form etched reliefs as illustrated in Fig. 2. These reliefs may represent complemental color aspects of a scene, in which case they are dyed complementary colors to produce a picture in natural colors when viewed by transmitted light. However when used as matrices in imbibition printing they preferably represent the same color aspect of the scene so that the dye may be applied by passing the film through a dye bath. Thus the dye would be absorbed by the reliefs on both sides simultaneously. The dye from the two sides can then be transferred to two imbibition blanks simultaneously by pressing the two blanks against opposite sides of the matrix at the same time or separately by first pressing one side of the matrix against one blank and then pressing the other side of the matrix against the other blank.

It should be understood that the present disclosure is for the purpose of illustration only and that this invention includes all modifications and equivalents which fall within the scope of the appended claims.

I claim:

1. Photographic sheet material comprising a backing, on each side of said backing a coating which emits secondary radiation in response to primary radiation, over each coating a layer of silver halide emulsion which is sensitive to the secondary radiation from the adjacent coating, each layer freely transmitting the primary radiation and being substantially insensitive thereto and being sufficiently absorptive of the secondary radiation to restrict photographic image formation substantially to the inner side of the layer and, intermediate said coatings, filter material in concentration sufficient to prevent substantial image formation in the other layer by the secondary radiation, whereby secondary radiation from each coating exposes the adjacent layer from the inside without exposing the layer on the other side of the backing.

2. In the art of photography with sheet material of the type comprising a backing, on each side of the backing a coating which emits secondary radiation in response to primary radiation, and over each coating a layer of silver halide emulsion which is sensitive to the secondary radiation from the adjacent coating, the method of making relief images in the layers of such material which comprises exposing through each layer the adjacent coating with light which is distributed in accordance with an image and to which the layer is substantially insensitive, thereby to generate secondary radiation distributed in accordance with the image, exposing the adjacent layer from the rear side with said secondary radiation, absorbing the secondary radiation in the layer sufficiently to restrict image formation substantially to the rear side thereof, leaving the front side of the layer substantially unexposed, obstructing the passage of secondary radiation from each coating to the layer on the other side of said base, and removing the unexposed front side of each layer to form a relief image.

GERALD F. RACKETT.

REFERENCES CITED

The following references are of record in the file of this patent:

UNITED STATES PATENTS

| Number | Name | Date |
|---|---|---|
| 1,448,456 | Levy et al. | Mar. 13, 1923 |
| 1,953,175 | Hebbel | Apr. 3, 1934 |
| 1,976,152 | Thornton | Oct. 9, 1934 |
| 2,331,492 | Michaelis | Oct. 12, 1943 |

FOREIGN PATENTS

| Number | Country | Date |
|---|---|---|
| 330,997 | Great Britain | June 26, 1930 |